Nov. 28, 1961 J. B. ROLFE 3,010,426
SCALE POINTER INDEX
Filed April 11, 1960
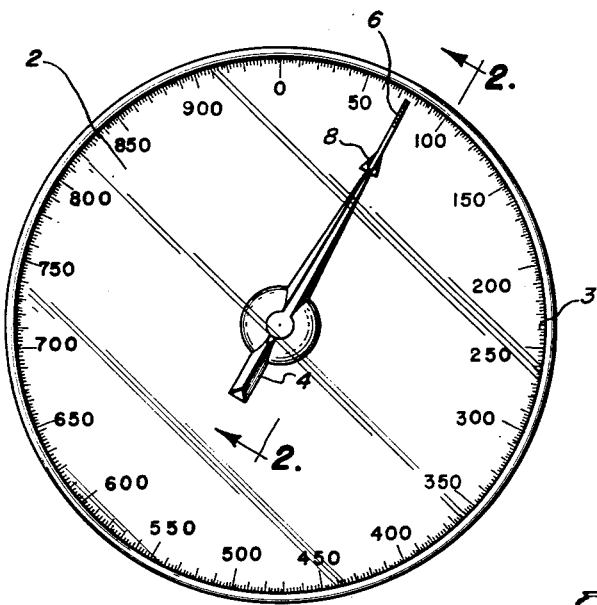
FIG. 1
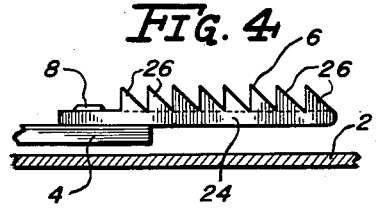
FIG. 4
FIG. 2
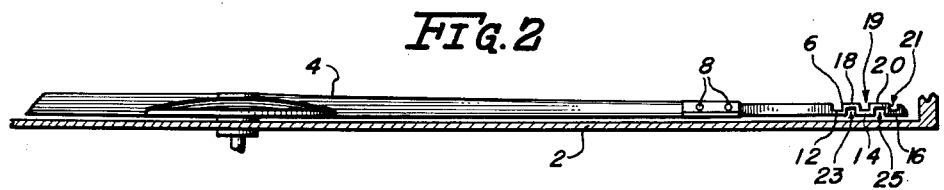
FIG. 3
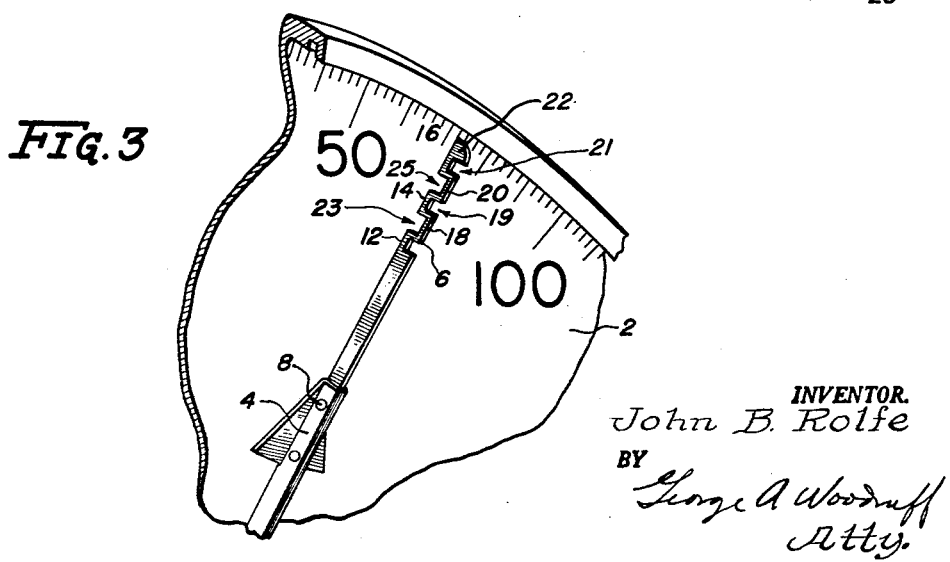
INVENTOR.
John B. Rolfe
BY
George A. Woodruff
Atty.

United States Patent Office 3,010,426
Patented Nov. 28, 1961

3,010,426
SCALE POINTER INDEX
John B. Rolfe, St. Johnsbury, Vt., assignor to Fairbanks, Morse & Co., Chicago, Ill., a corporation of Illinois
Filed Apr. 11, 1960, Ser. No. 21,267
2 Claims. (Cl. 116—136.5)

This invention relates to indicator indexing means and is particularly directed to novel indicator indexing means for cooperation with an indicator face or dial bearing suitable information indicia and an arm or pointer movable with respect to said face to provide desired indication.

In the manufacture of indicating devices, such as scales or the like, it is common to provide an indicator face and an arm or pointer which is movable with respect to said face and which cooperates with the indicia to display desired information. Unfortunately, with such devices, it is necessary for an observer desiring to read the information, to accurately position himself with respect to the indicator face and arm. Otherwise, parallax will cause erroneous information to be read. Furthermore, it is often extremely difficult for the observer to determine whether or not he is properly positioned for accurate reading. Accordingly, considerable time may be lost trying to assure accurate alignment with respect to the indicator face and arm.

Numerous devices have been proposed heretofore to overcome these problems. However, none of the proposed solutions have been entirely satisfactory.

These disadvantages of the prior art are overcome with the present invention and a novel indicator index is provided which virtually eliminates errors due to parallax, while making it possible to actually reduce the drag of the index arm. Moreover, the indicator index of the present invention reduces the material required for the indicator arm and requires no additional counterbalancing. Thus, the indicator index of the present invention materially reduces the cost of the indicator arm while facilitating ease and accuracy of reading.

The advantages of the present invention are preferably attained by providing a novel indicator index which is formed of a fretted strip of sheet material and which is mounted on the outer end of the indicator arm in such a way as to cause the indicator index to lie in a plane perpendicular to the plane of the indicator face.

Accordingly, it is an object of the present invention to provide a novel indicator index.

Another object of the present invention is to provide a novel indicator index which virtually eliminates erroneous readings due to parallax.

A further object of the present invention is to provide a novel indicator index which adds no additional drag to the indicator arm.

A specific object of the present invention is to provide a novel indicator index for cooperation with an indicator having an indicator face and an indicator arm mounted for movement with respect to said indicator face to provide an indication, said indicator index comprising a fretted member formed of sheet material and mounted on the outer end of said indicator arm in such a way as to cause said index to lie in a plane perpendicular to the plane of said indicator face.

These and other objects and features of the present invention will be apparent from the following detailed description taken in connection with the figures of the accompanying drawing.

In the drawing:

FIG. 1 is a front view of a typical indicating device having an indicator index embodying the present invention.

FIG. 2 is an enlarged side view, partly in section, of the indicator index of FIG. 1, taken on the line II—II thereof;

FIG. 3 is an enlarged partial broken-away view of the indicator index of FIG. 1 from a slightly parallactic position; and FIG. 4 is an enlarged side view, partly in section, of a modified form of a tip portion of the indicator index in FIG. 1.

In that form of the present invention chosen for purposes of illustration in the drawing, FIG. 1 shows an indicating device 1, such as a scale or the like, having an indicator face 2 bearing suitable indicia 3 and an indicator or pointer arm 4 mounted for movement with respect to said face 2 to display information. In order to accurately indicate the information being displayed, a reading tip or indicator index 6 is secured to the end of arm 4 by any suitable means, such as rivet 8. The indicator index 6 is preferably formed of a thin strip of sheet material and is secured to the arm 4 in such a manner that the indicator index 6 is presented edgewise to the indicator face 2 and lies in a plane extending perpendicular to the plane of the indicator face.

As seen in FIGS. 1 and 2, the indicator index 6 is formed with a plurality of portions 12, 14 and 16 defining a straight line and is provided with a plurality of other portions 18, 20 and 22 which are offset or displaced from the straight line portions 12, 14 and 16. As indicated above, the index 6 is in the form of a thin strip presented edgewise to the indicator face 2. Thus, the portions 12, 14, 16, 18, 20 and 22 produce a rectilinearly undulating form between the opposite longitudinal edges of the strip. When viewed edgewise, that is, from a position in the plane of the indicator index 6, as seen in FIG. 1, the indicator index 6 appears as a straight line. On the other hand, when viewed from any position outside of this plane, as in FIGS. 2 and 3, the displaced portions 18, 20 and 22 immediately become apparent as serrations of indentations, thereby providing an indication that the observer is not properly aligned to obtain an accurate reading.

It should be noted that the areas between the portions 18, 20 and 22 of the indicator index 6 which are offset from the straight line portions 12, 14 and 16 are cut out so as to be discontinuous or irregular, as seen at 19 and 21. Moreover, if desired, portions of the index adjacent the straight line region thereof may be cut out, as seen at 23 and 25 in FIG. 1. This, together with the cut out portions forming the discontinuities 19 and 21 greatly reduce the weight on the indicator arm 4 which must be counterbalanced. Furthermore, with the index of the present invention the length of the indicator arm 4 may be reduced, thereby actually reducing the weight below that of a conventional indicator arm. Furthermore, it has been found that when viewed from a slight angle, as in FIG. 3, this discontinuity is much more readily apparent than a blade-type or continuous index. As seen in FIGS. 2 and 3, the index 6 of the present invention is preferably fretted or formed with the offset portions 18, 20 and 22 arranged at spaced intervals along the length of the index 6.

FIG. 4 illustrates an alternative form of the indicator index of FIG. 1. In this form of the invention, the portion of the index 21 lying below the dotted line 23, as seen at 24, forms the straight line portion, corresponding to portions 12, 14 and 16 of FIG. 1, while the offset portions, corresponding to portions 18, 20 and 22 of FIG. 1, are in the form of triangular fins 26 lying in a plane perpendicular to that of the indicator face 2.

In addition, numerous other variations and modifications may obviously be made without departure from the invention. Accordingly, it should be clearly understood that the forms of the invention described above and shown in the figures of the accompanying drawing are illustrative only and are not intended to limit the scope of the invention.

What is claimed is:

1. A dial indicator assembly, said indicator assembly including a dial having indicia on the face thereof adjacent the peripheral edge and an indicator arm pivotedly mounted on the dial to cooperate with and overlie the dial, said indicator arm including an index means at the end thereof overlying the dial indicia, and said index means having a plurality of spaced portions laterally offset in a plane through the longitudinal axis of the arm and normal to the plane of the dial.

2. A dial indicator assembly, said indicator assembly including a dial having indicia on the face thereof adjacent the peripheral edge and an indicator arm pivotedly mounted on the dial to cooperate with and overlie the dial, index means, and means connecting the index means to the arm so that the index means overlies the dial indicia, said index means comprising a strip of sheet material which includes a plurality of spaced portions, laterally offset in the plane of the strip relative to the longitudinal axis of the strip in a single plane, the plane of the offset portions being normal to the plane of the dial.

References Cited in the file of this patent

UNITED STATES PATENTS 2,659,976    Callahan _____ Nov. 24, 1953

FOREIGN PATENTS 119,513    Switzerland _____ Mar. 16, 1927